US012760778B2

(12) United States Patent
Hodgson et al.

(10) Patent No.: US 12,760,778 B2
(45) Date of Patent: Oct. 13, 2026

(54) METHODS AND DEVICES FOR ABSORBING ENERGY

(71) Applicant: William Marsh Rice University, Houston, TX (US)

(72) Inventors: Darel Hodgson, Houston, TX (US); Mohammad Salehi Najafabadi, Houston, TX (US); Reginald Desroches, Houston, TX (US)

(73) Assignee: William Marsh Rice University, Houston, TX (US)

(*) Notice: Subject to any disclaimer, the term of this patent is extended or adjusted under 35 U.S.C. 154(b) by 811 days.

(21) Appl. No.: 18/028,331

(22) PCT Filed: Sep. 24, 2021

(86) PCT No.: PCT/US2021/052067
§ 371 (c)(1),
(2) Date: Mar. 24, 2023

(87) PCT Pub. No.: WO2022/067109
PCT Pub. Date: Mar. 31, 2022

(65) Prior Publication Data

US 2023/0407937 A1 Dec. 21, 2023

Related U.S. Application Data

(60) Provisional application No. 63/083,803, filed on Sep. 25, 2020.

(51) Int. Cl.
*F16F 1/36* (2006.01)

(52) U.S. Cl.
CPC .... *F16F 1/3605* (2013.01); *F16F 2224/0258* (2013.01)

(58) Field of Classification Search
None
See application file for complete search history.

(56) References Cited

U.S. PATENT DOCUMENTS

| | | | | |
|---|---|---|---|---|
| 7,398,964 B2 | 7/2008 | Knowles et al. | | |
| 9,004,242 B2 * | 4/2015 | Hodgson | F16F 1/37 | 267/136 |
| 2011/0150378 A1 * | 6/2011 | Care | F16C 25/06 | 384/438 |

FOREIGN PATENT DOCUMENTS

| | | | | |
|---|---|---|---|---|
| CN | 210290564 U * | 4/2020 | | |
| KR | 100810518 B1 | 3/2008 | | |
| KR | 20100013192 A * | 2/2010 | H04M 1/0237 | |
| KR | 101445500 B1 | 9/2014 | | |

(Continued)

OTHER PUBLICATIONS

WO-2010074229-A1: English Machine Translation (Year: 2010).*

(Continued)

*Primary Examiner* — Melanie Torres Williams
(74) *Attorney, Agent, or Firm* — Osha Bergman Watanabe & Burton LLP

(57) ABSTRACT

A damping device includes a superelastic element made of an austenitic shape memory alloy and an energy-absorbing element adjacent to the superelastic element, wherein the energy-absorbing element is made of a material selected from a shape memory alloy, a malleable metal or alloy, and a viscoelastic polymer, and wherein deformation of the energy-absorbing element is restrained by the superelastic element.

14 Claims, 6 Drawing Sheets

(56) References Cited

FOREIGN PATENT DOCUMENTS

| | | | | | |
|---|---|---|---|---|---|
| KR | 101669426 | B1 | | 10/2016 | |
| KR | 102147603 | B1 | | 8/2020 | |
| WO | WO-2010074229 | A1 | * | 7/2010 | ................ F16F 7/00 |

OTHER PUBLICATIONS

CN-210290564-U: English Machine Translation (Year: 2020).*
KR-20100013192-A: English Machine Translation (Year: 2010).*
International Search Report issued for corresponding international patent application No. PCT/US2021/052067, mailed Jan. 5, 2022 (3 pages).
Written Opinion issued for corresponding international patent application No. PCT/US2020/052067, mailed Jan. 5, 2022 (5 pages).

* cited by examiner

METHODS AND DEVICES FOR ABSORBING ENERGY

CROSS-REFERENCE TO RELATED APPLICATIONS

This application claims the benefit of priority to U.S. Provisional Application No. 63/083,803, filed on Sep. 25, 2020, and entitled, “Methods and Devices for Absorbing Energy.” The entire contents of U.S. Provisional Application No. 63/083,803 is incorporated herein by reference.

U.S. Provisional Application No. 63/083,803 is related to U.S. Pat. Nos. 5,842,312, 9,004,242 and 9,410,592. The entire contents of each of those U.S. patents is incorporated by reference herein for all purposes.

BACKGROUND

Shape memory alloys (SMAs) are alloys (combinations of two or more metal elements) having the ability to recover their original shape after being subjected to relatively large strains (e.g., up to 8% strain). Shape recovery of shape memory alloys may be achieved through phase transformations in the material that are induced by temperature increase (referred to as a shape memory effect) or load removal (referred to as a superelastic or pseudoelastic effect). The composition and processing of a shape memory alloy may be selected to exhibit either superelasticity or shape memory effects in a selected temperature range. In operational temperature ranges, SMAs that exhibit shape memory effect are referred to herein as martensitic SMAs and abbreviated as MSMA, while SMAs that exhibit a superelastic effect are referred to herein as superelastic alloys or austenitic SMAs and abbreviated as ASMA. Examples of SMAs include AgCd, AuCd, CuAlNi, CuAlMn, CuSn, CuZn, CuZnX (where X may be Si, Sn, Al), InTi, NiAl, NiTi, FePt, MnCu, FeMnSi.

MSMAs undergo a change in their crystalline form, or atomic arrangement (a phase change), as they are cooled or heated through their transformation temperature (TTR). The martensite phase is thermodynamically favored at temperatures below the TTR, and the austenite phase is thermodynamically favored at temperatures above the TTR. For example, when an MSMA is under a lower temperature, having a martensitic structure, the MSMA may be deformed to several percent strain. MSMAs may typically be deformed with relatively low force when in its martensitic phase. When the deformed MSMA is subjected to heat, the MSMA transforms to an austenitic phase and returns to its pre-deformed shape. The SMA transformation between a high temperature austenite form and a low temperature martensite form may be referred to as thermoelastic martensitic transformation.

Thermoelastic martensitic transformation occurs due to the crystalline structure of SMA. In temperatures lower than the TTR, the martensitic form of the SMA has a twinned crystalline structure. When stress is applied to the twinned crystalline structure, the twinned crystalline structure detwins. When the temperature is raised to above the TTR, the atoms rearrange to the austenite form, where the crystalline structure of the austenite form has the same macroscopic shape as the twinned (pre-deformed) martensite form.

ASMAs (capable of exhibiting superelasticity) may incur a phase transformation between austenite and martensite from an applied mechanical load. For example, shear stress may be applied to an ASMA in an austenitic phase in an amount sufficient to cause it to transform to deformed martensite (which may relieve the applied stress in the microstructure). The ASMA may remain in the martensitic phase and deformed as long as the applied stress is maintained. When the applied stress is removed, the martensite form becomes unstable and reverts back to austenite form. ASMAs do not need a change in temperature to exhibit shape change.

FIG. 1 schematically shows the shape memory and superelastic effects of SMAs and the associated phase transformations, where $A_s$ is the austenitic starting temperature, $M_s$ is the martensitic starting temperature, $A_f$ is the austenitic finish temperature, $M_f$ is the martensitic finish temperature, $M_d$ is the temperature above which martensite cannot form by plastic deformation, $\sigma$ is stress, and $\varepsilon$ is strain. As shown, mechanical loading may transform an SMA into a detwinned martensite phase from an austenite phase (for an ASMA) or from a twinned martensite phase (for an MSMA). When the load is removed, in the case of an ASMA, the material undergoes another phase transformation from the detwinned martensite phase to the austenitic phase and the material returns to its undeformed shape. In the case of an MSMA, however, upon load removal, the material does not fully restore its original (pre-loading) shape unless heated. The area within the stress-strain curves represent the energy absorption, and thus damping capacity, of the SMAs. Such material behavior allows SMAs to absorb many cycles of loads without permanent damage to the material.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to devices made of at least two conjoined elements, including at least one superelastic element made of an ASMA and at least one supplemental energy-absorbing element that is in contact with the superelastic element(s) or otherwise structurally connected to the superelastic element(s). The supplemental energy-absorbing element(s) are made of materials capable of absorbing high levels of energy upon deformation, such as MSMA, lead, mild steel, copper, zinc, or other malleable metals or alloys and viscoelastic polymers. The superelastic and supplemental energy-absorbing elements are arranged such that they deform in unison, i.e., when one element is subjected to forces that deform it, the remaining elements undergo similar deformations and all the elements contribute to the device's force resistance. Forces that deform the first element may be absorbed by one or both of (i) deformation of the superelastic element(s), and (ii) deformation of the supplemental energy-absorbing element(s).

In another aspect, embodiments disclosed herein relate to damping devices that include at least two superelastic elements made of an ASMA, wherein the superelastic elements are held together in opposing strains such that each element is at least partially composed of stress induced martensite. For example, one of the two superelastic elements may initially be in tensile strain and the other superelastic elements may initially be in compressive strain when they are joined together.

In yet another aspect, embodiments disclosed herein relate to methods of making a damping device that includes conjoining at least one superelastic element with at least one supplemental energy-absorbing element, such that the supplemental energy-absorbing element(s) is restrained by the superelastic element(s) and the elements deform in unison.

Other aspects and advantages will be apparent from the following description and the appended claims.

BRIEF DESCRIPTION OF DRAWINGS

Wherever possible, like or identical reference numerals are used in the figures to identify common or the same elements. The figures are not necessarily to scale and certain features and certain views of the figures may be shown exaggerated in scale for purposes of clarification.

DETAILED DESCRIPTION

Figure 1:
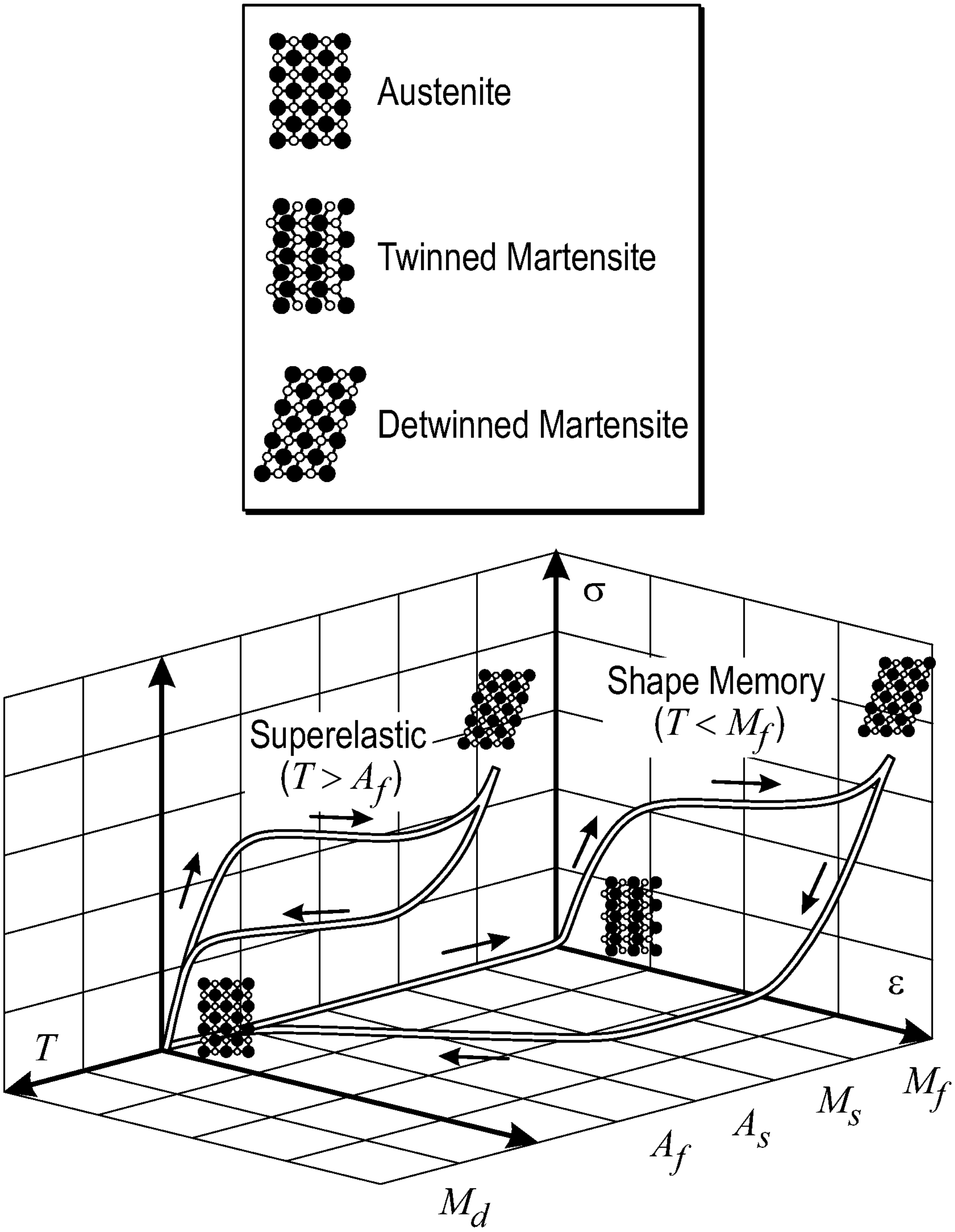
FIG. 1 (Prior Art)
FIG. 1 shows the mechanical responses of shape memory alloys exhibiting superelastic and shape memory effects at different temperature ranges.

Embodiments of the present disclosure are described below in detail with reference to the accompanying figures. In the following detailed description, numerous specific details are set forth in order to provide a more thorough understanding of the claimed subject matter. However, it will be apparent to one having ordinary skill in the art that the embodiments described may be practiced without these specific details. In other instances, well-known features have not been described in detail to avoid unnecessarily complicating the description.

Embodiments disclosed herein generally relate to damping devices made of multiple elements, including at least one superelastic element made of an ASMA, arranged in a codependent manner, such that when one of the elements is deformed, the other elements are also deformed (i.e., acting in unison). For example, devices disclosed herein may be formed of at least two elements that are jointly constrained together, where at least one of the elements is made of an ASMA and the other element(s) is made of an MSMA, a malleable metal, or other energy-absorbing alloy. The damping devices according to the embodiments of the present disclosure may be used, for example, in the seismic retrofit of structures (e.g., buildings and bridges) and vibration control for structures and machinery subject to dynamic loads.

Various materials may generally be used alone to absorb energy from deformation, and thus may be used to form damping devices. For example, energy-absorbing materials may include, but are not limited to SMAs (including ASMAs and MSMAs), malleable metals, such as tin, mild steel, copper, zinc, and lead, and viscoelastic polymers. Among SMAs, ASMAs are particularly advantageous because their superelasticity can minimize the residual deformations of the damping devices and the structures/systems adopting those after load removal. ASMAs, however, generally exhibit damping behavior at strain levels of greater than about 1%, and because ASMAs exhibit purely elastic behavior at lower strain levels, using ASMAs alone in damping devices may not be beneficial under small levels of movement.

The present disclosure describes configurations and methods of utilizing superelastic elements that provide improved damping devices, even under low levels of deformation (e.g., under less than 1% strain). Such configurations and methods may include mating a superelastic element made of an ASMA with at least one supplemental energy-absorbing element made of a material capable of absorbing energy at very low strain levels (e.g., below 0.2%) in a manner that the elements are jointly constrained to deform in unison. By conjoining a superelastic element with at least one other energy-absorbing element, as described herein, the effective damping of the overall device may be improved to cover a wider range of deformations, including low deformation amplitudes that would cause strain levels below about 1% in the superelastic element. Thus, simple fitted and mated assemblies of a superelastic element and at least one other energy-absorbing element, such as described herein, may provide surprisingly improved damping effects when compared with devices using superelastic elements alone.

For example, in some embodiments, elements of a damping device may include layered configurations of a first, superelastic element made of an ASMA and a second, energy-absorbing element made of another material with high energy absorption capability, such as mild steel or an MSMA. Configurations of the layered elements may include, but are not limited to, concentric rings, concentric tubular shapes, or bar-type elements. Some configurations may provide a unified response to an applied load without the need for additional fasteners. Device configurations described herein combine the shape recovery properties of the ASMA with the supplemental energy absorption of the energy-absorbing material to provide both self-centering and improved damping properties at low to high deformation amplitudes.

In some other embodiments, damping devices may comprise at least two superelastic elements made of the same ASMA or different ASMAs sized and assembled such that they are held in opposite initial strain states (e.g., a first superelastic element held in tensile strain by a second superelastic element held in compressive strain). If properly selected, the initial non-zero strains (e.g., 3-4%) make the superelastic elements act outside their elastic regions and absorb energy even at low deformation amplitudes.

Superelastic elements according to the embodiments of the present disclosure may be formed of an ASMA such as NiTi alloys (e.g., Nitinol and Ni-rich or Ti-rich NiTi alloys), CuZn alloys, ternary alloys such as NiCuTi alloys or NiHfri alloys, or alloys of iron, nickel, cobalt and aluminum, with small additions of tantalum and boron. Energy-absorbing elements according to embodiments of the present disclosure may be formed of any material exhibiting high energy absorption when deformed and having sufficient strength to hold its shape during the deformation process (e.g., so the energy-absorbing element does not get squeezed out of the assembly upon load applications). Examples of energy-absorbing materials include MSMAs, malleable metals or alloys, such as tin, mild steel, copper, zinc, lead, and alloys thereof, and even viscoelastic polymers. According to some embodiments, an energy-absorbing malleable material may be an alloy with a yield strength of less than about 50,000 psi and a yield strain of about 0.2% or less.

By using devices according to embodiments of the present disclosure, made of assemblies of at least one superelastic element and at least one energy-absorbing element mated together, the assembled elements deform together (act in parallel) when a load is applied to the device. By linking the damping properties of the energy-absorbing element (e.g., made of a malleable metal, SMA, or an oppositely strained element) to the springy shape restoration of the superelastic element, the assembly may provide improved energy absorption when compared with devices using a superelastic element(s) without a linked energy-absorbing element.

Additionally, devices may include at least one ASMA element that is held in a strained state, such that deformation of the strained ASMA element will create or annihilate stress induced martensite. Such devices may include, for example, a device with one ASMA element held in the strained condition (such that the ASMA element contains some stress induced martensite) by mating it to an energy absorbing element (e.g., a malleable metal or alloy element), or a device with two ASMA elements held in oppositely strained states by each other (where each element includes stress induced martensite). When devices according to embodiments of the present disclosure include at least two superelastic elements that are mated together in opposite strain states (such that the superelastic elements at least partially contain stress induced martensite), the damping properties of each may be modified by that from what a single unstrained superelastic element would exhibit. Such devices may thus have an improved range of damping properties. Further, by using the concept of mating two superelastic elements working against each other, the opposite-strained superelastic elements may be linked in other configurations besides concentric rings, such as torsional, bending, or tensile elements mated in opposition to each other, and may yield the same improved damping properties.

Devices according to embodiments of the present disclosure may contain multiple elements (e.g., one or more superelastic elements and one or more energy-absorbing elements) that may be assembled in different configurations. For example, elements may be provided in mating shapes (e.g., mating ring shapes, mating tubular shapes, mating bar shapes, mating irregular shapes, or other corresponding shapes), where the elements may be assembled together by closely or tightly fitting the elements together without the use of a fastener, adhesive, or welding. In other embodiments, elements may be assembled together in non-closely fitted arrangements, where the elements may be attached together using fastener(s) or welding. In yet other embodiments, devices made with oppositely-strained elements may be assembled using fastener(s) or welding to hold the elements together in their oppositely-strained states.

The shapes of the elements used to form a device according to embodiments of the present disclosure may be selected, at least in part, based on the material type of each element. For example, a device having at least one superelastic element made of an ASMA and at least one energy-absorbing element made of an MSMA or another malleable metal, the different elements may have mating shapes that may be fitted together without the use of a fastening device or structure. In some embodiments, a device may include two superelastic elements made of ASMA that are retained together in opposite strain states, where the elements may have various types of shapes, including shapes with elongate bodies that may be fastened together in at least two spaced apart locations (e.g., using fasteners at axial ends of the elements, welding the axial ends of the elements, using integrated locking features (e.g., tongue and groove geometries) in at least two spaced apart locations, and others).

Various examples of configurations for assembling at least one superelastic element with at least one energy-absorbing element and at least two superelastic elements of opposite initial strains in a constrained manner are provided below. However, other configurations of element assemblies may be envisioned where the elements of the assemblies may be joined together such that they deform in unison. Additionally, elements of devices disclosed herein may be used in various combinations and for different uses. For example, where a particular feature is disclosed in the context of a particular aspect, a particular embodiment, a particular claim, or a particular Figure, that feature can also be used, to the extent appropriate, in the context of other particular aspects, embodiments, claims, and Figures. Additionally, devices according to embodiments of the present disclosure may include elements not specifically described herein, but which provide features that are the same as, equivalent, or similar to the features specifically described herein.

Devices with Ring Configurations

According to embodiments of the present disclosure, a device may have an assembly of two or more concentric rings that are closely fitted together, where the rings may be made of the same material or different materials. For example, a ring assembly according to embodiments of the present disclosure may include at least one ring being an outer ring which is a superelastic first element, and at least one other ring being an inner ring which is an energy-absorbing second element and which is inside and closely fitted to the outer ring. According to embodiments of the present disclosure, the energy-absorbing element of the ring assembly may also be formed of an ASMA (where the ASMA elements may be held together in oppositely-signed strain states), or the energy-absorbing element may be formed of a different type of energy-absorbing material, such as an MSMA, malleable metals or alloys, such as tin, mild steel, copper, zinc, lead, and alloys thereof, and viscoelastic polymers.

The term "ring" is used in this specification in a broad sense to include not only rings that are circular in shape but also rings of another configuration, for example non-circular shapes such as an oval shape, or any other ring having a closed periphery which encloses an interior space. The term "closely fitted together" is used in a broad sense to include not only devices in which adjacent surfaces of the rings are in continuous contact with each other but also devices in which there is sufficient contact between the rings to ensure that, when the outer ring is deformed by external forces, an inner ring is also deformed or otherwise changed to absorb at least some of the energy imparted by the external forces. In such manner, rings that are closely fitted together may be considered as being connected together even though a separate connection mechanism is not used to hold the rings together.

Figure 2:
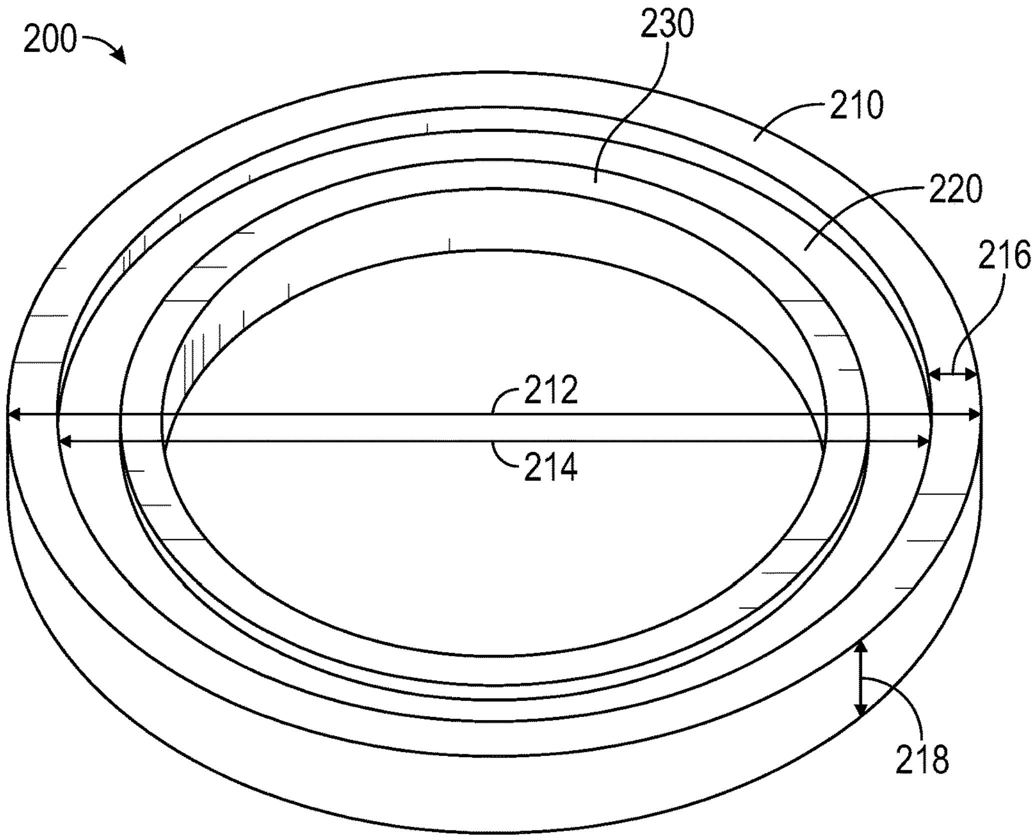
FIG. 2 shows a device according to embodiments of the present disclosure.

FIG. 2 shows an example of a device 200 in a multi-ring configuration according to embodiments of the present disclosure. The device 200 may include an assembly of (1) an outer superelastic element 210, (2) an intermediate energy-absorbing element 220 held inside the outer superelastic element 210 by closely fitting together the energy-absorbing element 220 within the outer superelastic element 210 (e.g., such that the entire outer perimeter of the intermediate energy-absorbing element contacts and fits within the entire inner perimeter of the outer superelastic element), and (3) an inner superelastic element 230 held inside the intermediate ring 220 by closely fitting together the inner superelastic element 230 within the intermediate energy-absorbing element 220.

The outer and inner superelastic elements 210, 230 may be made of an ASMA, where the inner ring 230 may be made of an ASMA that is the same as or different than the ASMA forming the outer ring 210. The energy-absorbing element 220 may be composed of an energy-absorbing material, for example, a malleable metal such as an MSMA, lead, or a low-carbon steel (mild steel) or another material that is equivalent in deformability to such a metal. The energy-absorbing element 220 made of such a malleable material may absorb energy when deformed by very small amounts. In some embodiments, a three-ring device may include an outer ring composed of an austenitic nickel-titanium alloy, an intermediate ring composed of martensitic nickel-titanium alloy, and an inner ring composed of an austenitic nickel-titanium alloy.

The outer superelastic element 210 may be in the shape of a ring having an outer diameter 212, an inner diameter 214, a thickness 216 measured between the outer diameter 212 and inner diameter 214, and a width 218 measured between opposite face surfaces of the ring along a dimension perpendicular to the thickness 216. The energy-absorbing element 220 may include outer diameter that is equal to the inner diameter 214 of the outer element 210, an inner diameter, a thickness measured between the outer diameter and inner diameter, and a width. The inner superelastic element 230 may include an outer diameter that is equal to the inner diameter of the energy-absorbing element 220, an inner diameter, a thickness measured between the outer diameter and inner diameter, and a width. Depending on the material used, the outer superelastic element 210 may have a width 218 or a thickness 216 that is greater than or lesser than the width or the thickness, respectively, of the energy-absorbing element 220 in their un-deformed shapes, and the intermediate energy-absorbing element 220 may have a width or a thickness that is greater than or lesser than the width or the thickness, respectively, of the inner superelastic element 230 in their un-deformed shapes. In some embodiments, each ring in a multi-ring device may have the same thickness and/or the same width.

The dimensions of the rings 210, 220, 230 may vary depending upon the intended use of the device. The relevant dimensions of the rings 210, 220, 230 include the diameters 212, 214 of the rings, the thicknesses 216 of the rings, and the widths 218 of the rings. For example, the thickness of each element in a device 200 may be selected to absorb an anticipated load or to provide certain levels of damping and self-centering under certain levels of deformation. In some embodiments, the thickness of a superelastic element (e.g., ring 210) may be selected based on an anticipated displacement that may be incurred from the movement of a connected structure (e.g., building movements), and the thickness of a connected energy-absorbing element (e.g., ring 220) may be selected to be capable of supplementing the energy absorption of the adjacent superelastic elements to a certain extent while not compromising its shape recovery more than a certain extent. For example, in some embodiments, each ring in a multi-ring device, such as shown in FIG. 2, may have a thickness ranging from 5 to 15 percent of an outer diameter of the ring.

In some embodiments, the inner ring 230 and the outer ring 210 may have an equal thickness and an equal width, and the intermediate ring 220 may have a thickness that is either greater than or less than the thickness of the inner ring 230 and the outer ring 210 and a width that is either greater than or less than the width of the inner ring 230 and the outer ring 210.

For small devices, and device prototypes used for testing purposes, the dimensions of the rings may be, for example, diameters ranging from 6 to 12 inches, thicknesses ranging from 0.3 to 1.8 inch, and widths ranging from 1 to 3 inches. For devices to be used in the protection of buildings (e.g., for protection against earthquakes) or to be used for other larger structural purposes, the rings may have larger dimensions, including, for example, diameters ranging from 12 to 48 inches, thicknesses ranging from 0.6 to 7.2 inches, and widths ranging from 2 to 6 inches. In some embodiments, adjacent rings in concentric ring assemblies can have the same widths.

In some embodiments, in addition to designing the thickness of rings in a ring configuration device, the thickness of a ring may be selected, at least in part, based on the material properties of the ring. For example, the thickness of an ASMA ring may be selected to be large enough to absorb a minimum amount of energy and provide a minimum level of shape recovery for the entire device, but small enough to reduce the risk of its permanent plasticity and early fracture. The thickness of an energy-absorbing ring may be selected such that it absorbs a large amount of energy, while it does not fracture under its anticipated levels of deformation. Thus, the dimensions of the rings 210, 220, 230 may be selected so that, when the assembly is subjected to a force, the damping device absorbs the maximum possible energy, while the ASMA rings 210, 230 can still recover to or towards their original shapes after the force has been removed and cause the energy-absorbing ring 220 of malleable material to return to or towards its original shape. According to embodiments of the present disclosure, a thickness-to-diameter ratio of each ring in a ring configuration device may be mathematically derived based on an anticipated maximum deformation of the ring and the constitutive behavior of the material forming the ring.

When an assembly of rings such as device 200 according to embodiments of the present disclosure is subjected to a force which deforms the interior space enclosed by an outer ASMA ring, e.g., by increasing or decreasing one of the major axes of the ring, the assembly may absorb part of the energy of the force which causes the deformation. Preferably, but not necessarily, after removal of the force that caused the deformation, the superelastic property of the ASMA ring may cause the assembly to return to or towards its original shape, so that when the assembly is subjected to a second force which deforms the interior space enclosed by the rings, the device may absorb part of the energy of the second force. In this way, the assembly can absorb repetitive forces and, more importantly, restore the structure/system equipped with the device to or toward its initial position.

The embodiment shown in FIG. 2 shows an example of a three-ring configuration. However, other embodiments may have a two-ring configuration, or a multi-ring configuration with more than three rings. For example, a two-ring device according to embodiments of the present disclosure may include an assembly of (1) an outer ring made of an ASMA (e.g., the outer ring 210 shown in FIG. 2) and (2) an inner ring which is composed of an easily deformable (malleable) material, for example lead or low-carbon steel (e.g., the energy-absorbing ring 220 shown in FIG. 2). In some embodiments, a two-ring assembly may include an assembly of an ASMA outer ring and an MSMA inner ring held within the outer ring. The ASMA outer ring may be composed of an austenitic nickel-titanium alloy and the MSMA inner ring may be composed of a martensitic nickel-titanium alloy.

In some embodiments, a multi-ring device may be formed of multiple ASMA elements assembled together in a pre-strained state. In such embodiments, at least an inner ASMA ring or an outer ASMA ring may be initially deformed to concentrically fit together (e.g., the inner ASMA ring deformed to a compressed pre-strain state to fit within the outer ASMA ring, the outer ASMA ring stretched to fit around the inner ASMA ring, or the inner ASMA ring may be compressed and the outer ASMA ring may be stretched to nest the rings together), where the pre-strained state of one of the ASMA ring elements may result in the other of the ASMA rings to be held in a pre-strained state when the ASMA elements are assembled together. The initial strains may also be large enough to ensure that the ASMA rings have entered their martensitic transformation region so they absorb energy even if they undergo small strain changes under external loading.

The energy absorption capabilities of a multi-ring device may be determined from the sum of the energy absorption provided by each of the rings in the device. For example, the energy absorbed by a double-ring device when the device is deformed may be the sum of the energy absorbed by each of the two rings (e.g., a superelastic element and energy-absorbing element). If properly sized and designed, the elastic strength of the outer ring may be sufficient to restore both (or more) rings to or towards their original shape when the deforming force is removed. Additionally, when a device has more than two rings, where two or more alternate rings may be composed of an ASMA, a middle ring may be made thicker and the device may still have enough superelasticity to move the rings to or towards original shape when the force is removed. For example, three-ring assemblies may be similar to embodiments of two-ring assemblies, but the thickness of the intermediate ring in a three-ring assembly may be relatively larger (when compared with an inner energy-absorbing ring of a two-ring assembly) because it is captured between two ASMA rings, and, after removal of the forces, the intermediate ring may be restored to or towards its original shape by the superelastic recovery forces of both the ASMA rings.

Two-ring, three-ring, and other multi-ring assemblies may be useful when it is anticipated that the forces applied to the assembly will be such that the ASMA rings will not undergo stress-induced transformation, for example, the forces produced by the wind buffeting of skyscrapers. However, these embodiments may also be used to absorb greater forces, for example, forces generated by an earthquake, causing stress-induced transformation in the ASMA rings.

Devices according to embodiments of the present disclosure having an assembly with a concentric ring configuration may allow for damping in multiple directions, whereas conventionally formed damping devices may only provide damping in one direction (e.g., along an axial direction). In other words, devices having concentric ring configurations according to embodiments of the present disclosure may provide resistance to loading in arbitrary and multiple directions, which may give such devices the ability to be implemented in a variety of structures with a variety of connection systems.

Additionally, as provided above, devices having ring configurations according to embodiments of the present disclosure may include ring elements having a circular shape or non-circular shape (e.g., an oval shape, a rectangular shape, a polygonal shape, an irregular shape having a combination of straight and/or curved sides). Whichever shape the ring elements are provided in, the ring elements may be nested together in such a way that the ring elements deform together when a load is applied to at least one of the ring elements. For example, a device having a non-circular ring configuration may have an outer ring having a closed periphery which encloses an inner ring, where the inner ring is closely fitted within the outer ring. When the outer ring of such device is strained, the fitted inner ring may deform with the outer ring. In such manner, closely fitted ring configurations, such as described herein, may move together in unison as at least one of the elements is deformed. In other words, when one element in a device is deformed, such deformation may also deform a closely fitted element in the device without the use of an external framework (e.g., without using a separate support structure transferring forces).

By strategically constraining the movements/deformations of concentrically nested elements together in a damping device, the damping device may be assembled without the complex mechanisms/connections used in previously-developed SMA-based hybrid dampers to achieve simultaneous energy dissipation in both superelastic elements and energy-absorbing elements and to avoid buckling under compressive loading (especially in multi-ring damping devices). For example, devices formed of concentrically nested elements (e.g., multi-ring devices described above) may be assembled together without using a fastener or welding.

Additionally, by providing a superelastic element made of an ASMA as the outermost element of a multi-ring device, the superelastic element may return the device to or toward its original shape after load removal. For example, a superelastic outer element, when subjected to a force, may deform via stress-induced martensitic transformation (a superelastic or pseudoelastic effect). When the force is released, the stress-induced martensite may revert to the previous crystal structure, and the deformation may be at least partially reversed, thereby improving performance of the damping device.

Devices with Other Shaped Elements

Other energy-absorbing devices according to embodiments of the present disclosure may include superelastic and energy-absorbing elements that may be assembled together in an arrangement other than concentric rings. The elements may be assembled together (e.g., in a closely fitted arrangement or using a fastening mechanism and requiring no extra elements) such that they deform together when subjected to an external force and may deform in unison without the use of a separate framework or support structure.

For example, in some embodiments, elements forming an energy-absorbing device may have elongate bodies, e.g., elongate tubular bodies having a round, rectangular, or other cross-sectional shape, elongate bars having a round, rectangular, or other cross-sectional shape, or a combination of elongate tubular and bar bodies. For example, a device according to embodiments of the present disclosure may include first and second elements with elongate tubular shapes, where an outer first element may be fitted around an inner second element. The first, outer element may be formed of an ASMA, and the second element may be formed of an ASMA assembled in an opposite strain state from the first element, or the second element may be formed of an energy-absorbing material other than an ASMA, such as an MSMA. Concentrically assembled tubular elements may be joined together at the axial ends of the elements using a fastening mechanism, using a welding technique (e.g., spot welding or friction welding), using interlocking features, or by closely fitting the outer element around the inner element (e.g., friction fit).

Figure 3:
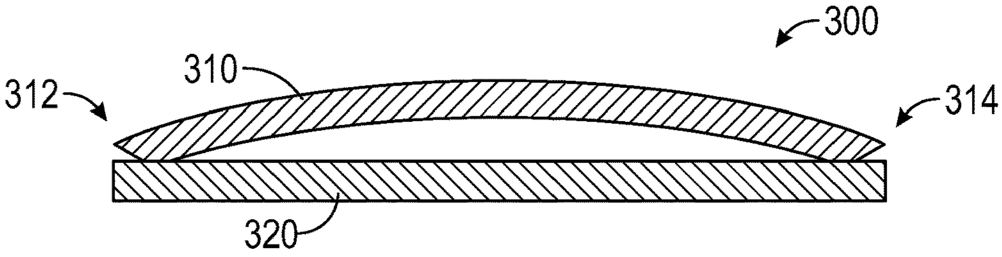
FIG. 3 shows a device according to embodiments of the present disclosure.
Figure 4:
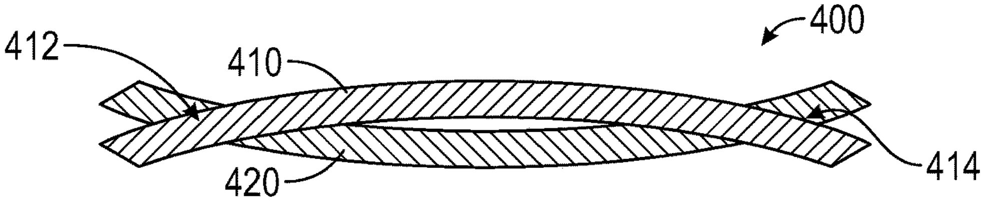
FIG. 4 shows a device according to embodiments of the present disclosure.

In some embodiments, devices may include two longitudinal elements, at least one of which is composed of an ASMA, where one end of each of the longitudinal elements may be joined together at a first location, the opposite ends of the elements may be joined to each other at a second location, and intermediate parts of the elements may be separate from each other. For example, FIGS. 3 and 4 show examples of different devices according to the embodiments of the present disclosure made of elements having elongate bodies that are joined together in at least two spaced apart locations. In FIG. 3, a device 300 according to the embodiments of the present disclosure may include a first superelastic element 310 attached to a second, energy-absorbing element 320, where the first and second elements 310, 320 are elongate bodies attached together at opposite axial ends 312, 314. In FIG. 4, a device 400 may include elements with elongate bodies that are joined in at least two spaced apart locations other than axial ends of the elongate bodies, where a first, superelastic element 410 may be attached to a second, energy-absorbing element 420 at two spaced apart locations 412, 414 a distance away from the axial ends of the elongate bodies. Elongate bodies may be arc-shaped and/or straight and may be connected using fasteners or by welding.

Other shapes and configurations of elements may be envisioned to provide a damping device according to embodiments of the present disclosure, where multiple elements (e.g., including a first superelastic element and at least one other energy-absorbing element) may be joined together in a manner that allows them to be deformed in unison when an external force is applied to the device. Additional examples of different assembly configurations are also described below with respect to the discussion of methods used to form devices according to embodiments of the present disclosure.

Methods

As discussed above, devices according to embodiments of the present disclosure may be formed of multiple elements joined together such that they deform in unison, where at least one element may be a superelastic element formed of an ASMA. Depending on, for example, material selection of one or more supplemental energy-absorbing elements used with the superelastic element, the shape of the multiple elements, manufacturing considerations, end use application, and other factors, device elements may be formed and assembled using different methods.

According to embodiments of the present disclosure, devices may generally be formed by fabricating a first element from a first ASMA, fabricating a second element from an energy-absorbing material (e.g., an MSMA, a second ASMA, lead, mild steel, copper, or zinc), and assembling the first and second elements together, such that the second element is restrained by the first element.

In embodiments where a device is made of two or more elements composed of different material types, e.g., a first superelastic element composed of ASMA and a second energy-absorbing element composed of a malleable material other than an ASMA, the elements may be assembled together in an initially un-strained configuration (e.g., where stress induced martensite is not formed in the ASMA element). For example, in such embodiments, a first superelastic element may be joined to a second energy-absorbing element made of a malleable material other than an ASMA by closely fitting the first superelastic element around the second energy-absorbing element (e.g., such as shown in FIG. 2) or by otherwise joining (e.g., by welding or using fastener(s)) the two elements together in a manner in which they may deform in unison when a force is applied to the device.

For example, methods of forming devices having a ring configuration may include two main steps: (1) fabrication of individual rings of desired dimensions and characteristics; and (2) placing the rings inside one another to achieve a targeted nesting configuration. Depending on their shape, the rings could be cut out of plates (e.g., via water jet cutting) or forged, where additional machining may be used to obtain tighter accuracy and acceptable surface finish. Superelastic rings may be further heat treated via preapproved regimes to ensure their superelastic behavior.

In some embodiments, methods of forming ring configuration devices may include fabricating more than two concentrically fitting rings, for example, including an outer ASMA ring, at least one intermediate ring, and an inner ASMA ring, where the intermediate ring(s) may be sandwiched between the outer ASMA ring and the inner ASMA ring. The concentric rings may be nested together, such that deformation of one of the rings results in deformation of the other rings in the device.

In some embodiments, a device may be made of two or more elements composed of different material types, e.g., a first superelastic element composed of ASMA and a second energy-absorbing element composed of a malleable material other than an ASMA, where the ASMA element may be assembled to the energy-absorbing element in a strained state, and where the strain is large enough to create stress induced martensite in the ASMA element.

In some embodiments, a device may be made of two or more elements all composed of the same material type, selected from an ASMA material. In embodiments where a device is made with two or more superelastic elements composed of ASMA, the superelastic elements may be assembled together in an initially strained configuration. In other words, devices made entirely of ASMA elements may be assembled by pre-straining (or deforming) the ASMA elements and then connecting the ASMA elements together to hold them in their pre-strained states when the device is in an unloaded condition (with no external forces applied to the device). This may be achieved, for example, by deforming an ASMA element in its martensitic phase (at a very low temperature), assembling the deformed ASMA element to another ASMA element that is unstrained (such that the two elements are in contact with each other and their deformations are constrained), and then raising the temperature of the first ASMA element such that the first ASMA element strains the second ASMA element when the first ASMA element returns to its austenitic phase. In such embodiments, when the ASMA element dimensions and the assembly plan are properly selected, both ASMA elements may have oppositely-signed yet equal initial strains. For example, according to embodiments of the present disclosure, ASMA elements may be selected to have similar overall shapes to form devices made of multiple superelastic elements held in oppositely strained states.

In an example method for forming a device with opposing initial strains in the elements, a first ASMA element may be chilled to its martensitic state and then strained it to about 3-6%. While in the chilled and strained state, the first ASMA element may be fitted to a second ASMA element. The assembly may then be warmed to ambient temperature, which due to the shape memory effect, may strain the assembled elements into oppositely-signed strain states (e.g., one in tension, the other in compression) having a least about 1-3% strain in each element. In another example, a first ASMA element may be mechanically loaded to a strain of about 3-6% and fitted around a second ASMA element. When the mechanical load is removed, a pre-strain of about 1-3% may be formed in each of the elements in oppositely-signed strain states.

By forming devices with competitively strained ASMA elements, a structure that is at least partly stress-induced martensite may be induced in the elements, so that any deformation of either element will immediately give annihilation or further creation of more martensite. Such behavior may absorb energy from deformation of the device and may occur without the initial non-damping elasticity (approx. 1%) in non-strained ASMA.

Devices made of oppositely-strained ASMA elements may have the ASMA elements pre-strained in various regimes, such as bending, torsion, and tension regimes. Additionally, devices having multiple ASMA elements held in opposite strains (e.g., compressive/tensile, bending/straight, or oppositely twisting) may be held together in different ways, for example, using integrally formed interlocking features, using fasteners, or by welding. According to embodiments of the present disclosure, when ASMA elements are pre-strained prior to assembly, the ASMA elements may be strained to an extent sufficient to create partial stress induced martensite in the ASMA elements. Various examples of devices made with pre-strained ASMA elements, including methods of assembling pre-strained ASMA elements into a device, are provided below.

In some embodiments, devices may include two or more ASMA elements pre-strained in a tension regime to an extent sufficient to create partial stress induced martensite in the assembled ASMA device, where one of the ASMA elements may be under tensile strain, and another ASMA element may be under compressive strain once assembled into the device. ASMA elements pre-strained in a tension regime may have different shapes and sizes.

For example, devices having a multi-ring configuration may be formed by pre-straining the ring elements in a tension regime. In such embodiments, methods of making damping devices having a ring configuration may include introducing initial strains in the rings. The initial strains could be introduced by placing rings of unequal outside and inside diameters inside each other. For example, in a double-ring configuration, the unstrained inner ring's outside diameter can exceed the unstrained outer ring's inside diameter, thereby creating initial positive (stretching) and negative (contracting) circumferential strains in the outer and inner rings, respectively, once the inner ring is placed inside the outer ring. The initial straining and ring dimensions may be designed such that the rings have at least more than 1% retained strain (e.g., 2-3% retained strain) when assembled together in the ring device to provide a stress induced martensite microstructure in the assembled device. In such manner, the initial straining may increase the hysteretic damping of a superelastic ring under low diametric deformations.

Additionally, individual rings may be slightly oversized in order to achieve closely-fitted rings in the final products (i.e., with full contact at interfaces). In order to place a ring outside another ring, the outer ring may be first expanded via temperature increase. In contrast, in order to place a ring inside another ring, the inner ring may be first contracted via temperature decrease. The same process may be applicable for the manufacturing of the devices with pre-strained rings, although initial mechanical straining may also be used in such cases.

For example, a method of making a device having a ring configuration may include introducing strains in a first ring element and/or a second ring element prior to fitting the second element inside the first element, wherein when the first and second ring elements are in an unstrained configuration, an outer diameter of the second ring element is greater than an inner diameter of the first ring element, and wherein when the second ring element is fitted inside the first ring element, the outer diameter of the second ring element is equal to the inner diameter of the first ring element.

In an example method of forming a two-ring device, two ASMA rings may be manufactured so that the outer diameter of a smaller ring is 6% larger (or other increased amount) than the inner diameter of a larger ring. To put the two rings together, the outer ring may be chilled to below its martensitic transformation, making it possible to expand its diameter by 6%. The outer ring may then be immediately fitted over the smaller ring. When the combination is warmed, the outer ring will attempt to shrink back to its original diameter via the shape-memory effect. If the thicknesses of the two rings have been appropriately chosen, the outer ring may remain strained, for example to about 3% increase in diameter, while the inner ring may be compressed for example to about 3% smaller diameter. In such manner, both ASMA rings are strained well past their elastic deformation limit and any further deformation will be by creation or annihilation of stress-induced martensite. As a result, energy absorption (damping) may occur even at very small deformations of the ring assembly.

It is also possible to use this technique with an MSMA inner ring or with a malleable ring composed of a material like mild steel when the sizes are chosen so that the ring undergoing shape memory shape recovery is prevented or restrained by the other ring from undergoing complete shape recovery. In some embodiments, the inner ring may be selected as the element undergoing shape memory shape recovery when, for example, the inner ring is composed of an ASMA, and when the inner ASMA ring is chilled to martensite and is compressed several percent in diameter before being fitted snugly into the inner diameter of a larger ring.

The possibility of restraining a shape memory element (or two or more such elements) from completing its martensite to austenite shape recovery by balancing it against other elements in a damping device, and thus changing its energy absorbing response, especially at small strain changes, can be applied to elements other than concentric rings, too. For example, strains may be introduced into other element configurations such as bar elements, tubular elements, or other elongated elements prior to assembling the elements to form a device according to embodiments of the present disclosure, such as described above. By joining multiple pre-strained elements together in a single assembly, the different properties of each element (e.g., the superelasticity from a superelastic element and deformability from an energy-absorbing element) may be used in combination to provide improved damping.

For example, in some embodiments, a device may include two or more longitudinal or elongate elements attached together in at least two spaced apart locations and held together in oppositely-signed strain states, which may be in a tension regime, a bending regime, or a torsional regime.

As an example of devices having two or more elongate elements attached together in opposite strain states, a first ASMA element with an elongate body may assembled to a second ASMA element having an elongate body, where one of the first ASMA element and the second ASMA element may be held in tensile strain, and the other of the first ASMA element and the second ASMA element may be held in compressive strain when assembled together. Such device may be formed, for example, by stretching one or more tensile wires. While in tension, the wires may be wrapped around a center shaft and attached to the center shaft. After attaching the elongate elements together, the tensile wires may induce compressive strain in the center shaft when the tensile wires attempt shape recovery either via shape memory or by stress induced superelastic transformation.

In some embodiments, the elongate bodies may be tubes that are concentrically assembled and attached together. Such assemblies may be formed, for example, by holding two separate concentric ASMA tubes at the same length and joining them together at two or more spaced apart locations (e.g., at each axial end), and where one of the tubes may be held under tensile strain and the other under compressive strain in order to achieve the same length. The inner tube element may be deformed to stretch to a longer length of the outer tube element, or vice versa, such that when the tubes are attached, the tube elements may be held together in an axially pre-strained state. In some embodiments, one tube may be stretched after chilling, and then assembled to a second concentric tube while in the chilled and stretched state. When the assembly (including the chilled tube) is brought to service temperature, due to shape recovery of the element, the stretched tube is held in an initial tensile strain while the other tube is held in an initial compressive strain.

In some embodiments, a device may include two or more ASMA elements assembled together in a torsional pre-strained state, where one of the ASMA elements may be pre-strained in a first rotational direction, and another of the ASMA elements may be pre-strained in an opposite rotational direction. For example, a device composed of opposing helical springs may operate via initial torsion-induced shear strain, and numerous spring configurations are possible. As another example, two or more ASMA tubes may be assembled together in a torsional pre-strained state. Such embodiments may be formed, for example, by providing two concentric tubes, where one tub is strained under torsion before the tubes are fastened together. The shape recovery of the strained tube may create retained shear strain in that tube while the other tube undergoes shear strain in the opposite direction.

Figure 5:
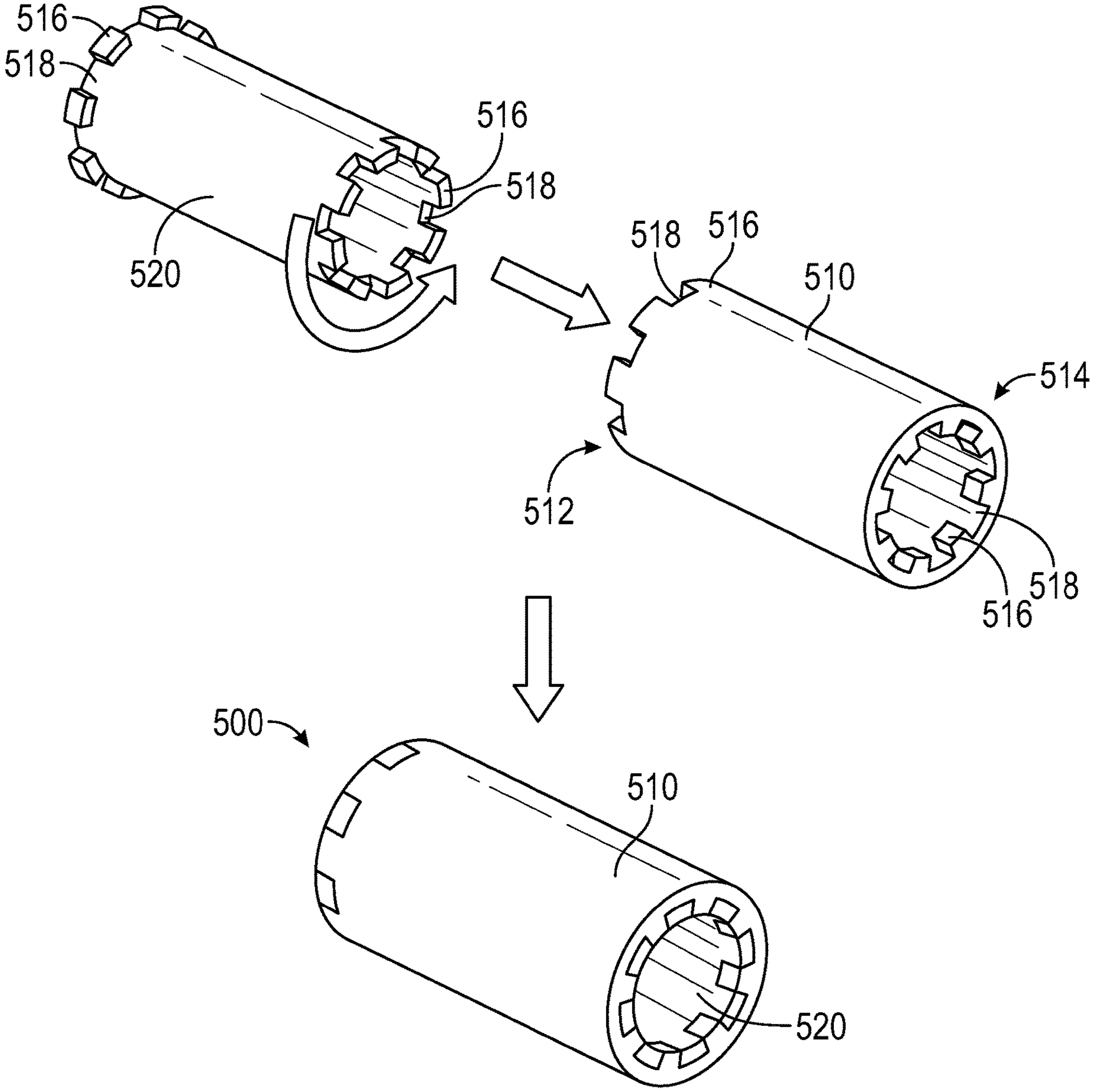
FIG. 5 shows assembly of a device according to embodiments of the present disclosure.

For example, FIG. 5 shows an example of a device 500 according to the embodiments of the present disclosure that includes a first ASMA element 510 attached to a second ASMA element 520 under opposite torsional strains. The first and second elements 510, 520 may be tubes that are concentrically positioned and attached together at opposite axial ends 512, 514. To assemble the device 500 under opposite strains, at least one of the ASMA tubes 510, 520 may be subjected to an initial torsional deformation (e.g., by holding one axial end stationary while rotating the opposite axial end) before the ends of the two tubes are connected to create initial oppositely-signed shear strains in the two tubes. In the embodiment shown, the axial ends 512, 514 of each ASMA tube 510, 520 may have interlocking features 516, 518 integrally formed at the ends, including a plurality of alternating ridges 516 and grooves 518. The interlocking features 516, 518 may be circumferentially aligned to fit within each other when one or both of the ASMA tubes 510, 520 are torsionally strained, and while torsionally strained, the tubes 510, 520 may be axially slid to concentrically fit together. When the interlocking features 516, 518 are fitted together, the ASMA tubes 510, 520 may be held in their pre-strained state to form the device 500. Such devices 500 may be used as torsional damping components. Interlocking features such as shown in the embodiment of FIG. 5 or other shapes of interlocking features may also be used in other embodiments disclosed herein.

In some embodiments, a device may include two or more elongate elements, at least one or each of the elongate elements being composed of an ASMA alloy and having, in the absence of any deformation, an arc shape (e.g., where the device is made of at least one ASMA element and at least one malleable or MSMA element or made of all ASMA elements). The elements may be separate from each other except at a first location where first ends of the elements are joined together and at a second location where second ends of the elements are joined together, where one or both of the elements were deformed (pre-strained in a bending regime) so that the ends could be joined together. Deforming the elements in order to connect the ends together may create a damping element which may absorb energy when loads are applied to the elements in bending, torsion and axial elongation or compression regimes.

Figure 6:
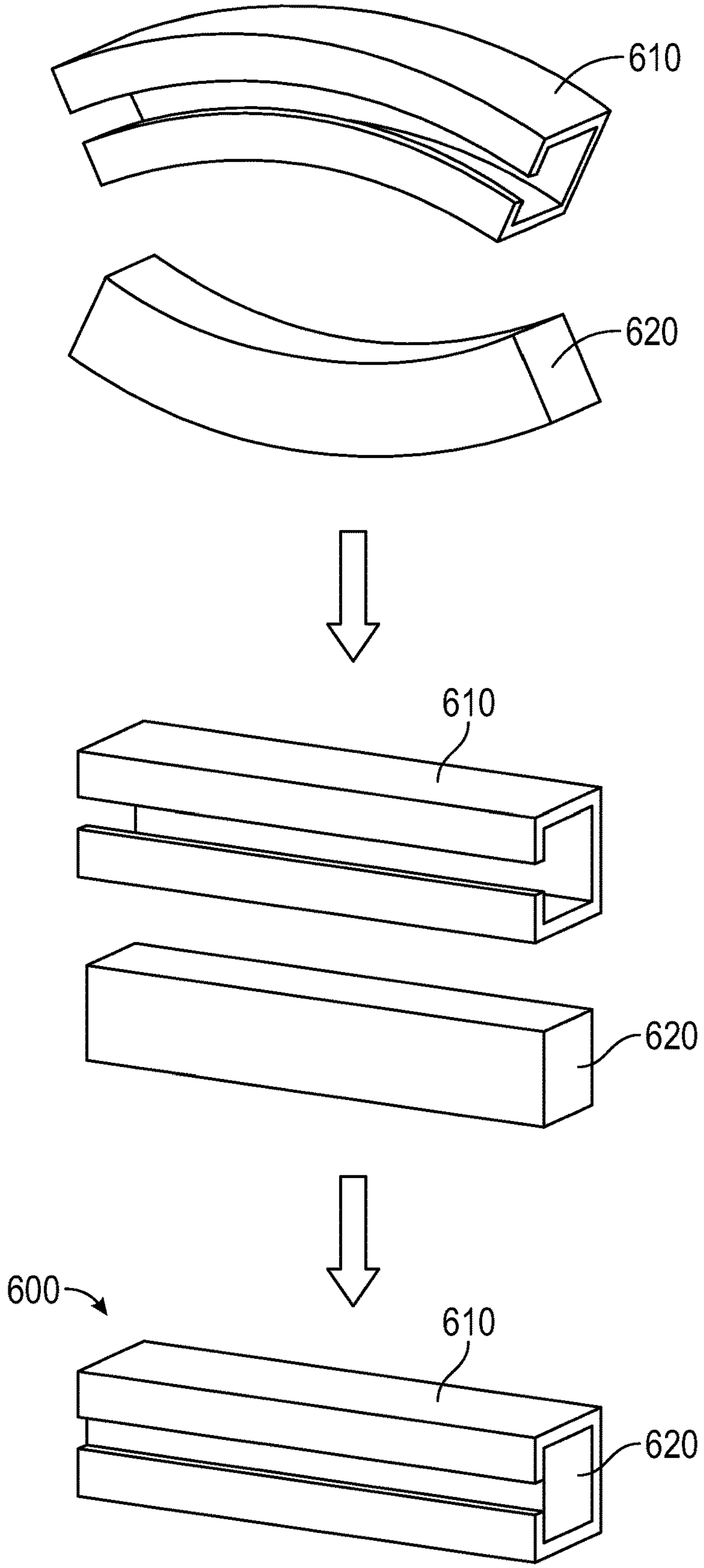
FIG. 6 shows assembly of a device according to embodiments of the present disclosure.

FIG. 6 shows an example of a device 600 according to embodiments of the present disclosure formed of two elongate elements 610, 620 made of an ASMA, where the ASMA elements 610, 620 may be initially provided in an arc shape. A first ASMA element 610 may be a tubular element, and the second ASMA element 620 may be a bar element having cross-sectional shape that matches the internal cross-sectional shape of the first ASMA tubular element. In the embodiment shown, the first and second ASMA elements 610, 620 have mating, generally square cross-sectional shapes, but other similar embodiments may have corresponding tubular and bar elongate elements with different cross-sectional shapes (e.g., circular, polygonal, or irregular). To assemble the first and second ASMA elements 610, 620 into the device 600, the first and second ASMA elements 610, 620 may be bent from their original arc shapes in opposite directions to a straight shape. While bent in the straight configuration, the second ASMA element 620 may be slid into the interior of the tubular first ASMA element 610 such that the arc bending actions of each element oppose each other. When the elongate ASMA elements 610, 620 are bent in opposing directions and held together in opposing bending strains by sliding one element inside the other element, the resulting pre-strained device 600 may be capable of absorbing a wider range of deformations when compared to using a single ASMA element alone.

As mentioned above, embodiments disclosed herein may be used to overcome limited energy absorption (damping) from using shape memory alloys alone from an incoming source after they have been elastically deformed to a point where they undergo further deformation by creation and annihilation of stress induced martensite (ASMA alloy) or by shifting of the martensite orientations (martensite alloy). This can be accomplished by pre-deforming (pre-straining) concentric rings or other element shapes using the shape memory effect.

Applications and Implementation of Damping Devices

Devices disclosed herein may be used in any way to absorb energy. In one use, they may be used for the stabilization of buildings which may be subject to forces generated by an earthquake or to forces generated by wind (for example in tall buildings such as skyscrapers). In this use, different parts of the device may be secured indirectly to different locations of the building, e.g., locations at different horizontal levels of the building and diagonally between adjacent columns. The device may be mounted to a connecting body, where the connecting body may be secured to different locations on the building so that, if there is a change in the distance between the locations on the building, that change generates resisting forces within the device. Devices disclosed herein may also be useful for other purposes including, for example, protecting medical devices, protecting electronic assemblies, and protecting vehicles and bridges from occasional or repetitive shocks.

Figure 7A:
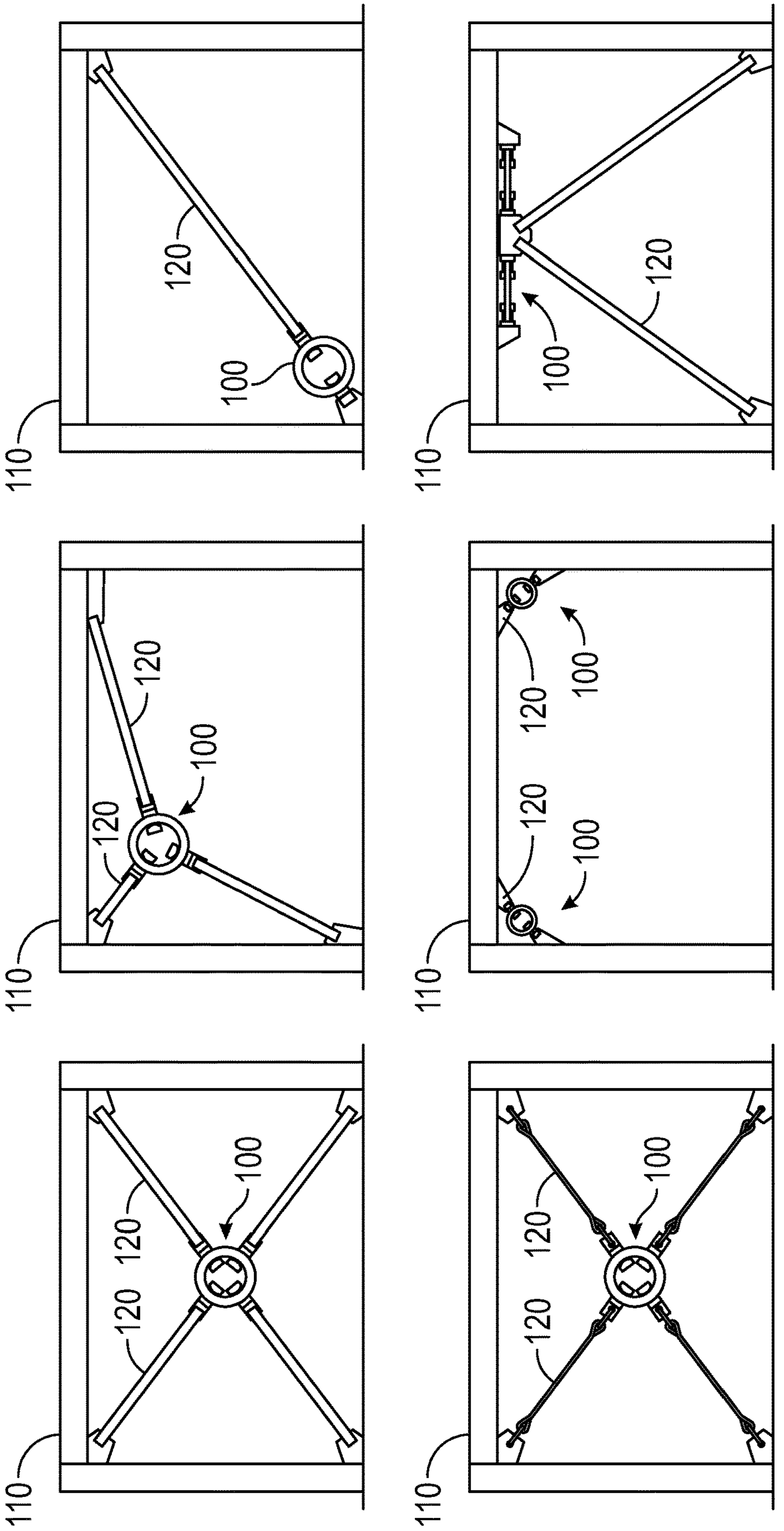
FIGS. 7A and 7B show examples of different configurations of connecting devices according to embodiments of the present disclosure to a structure.
Figure 7B:
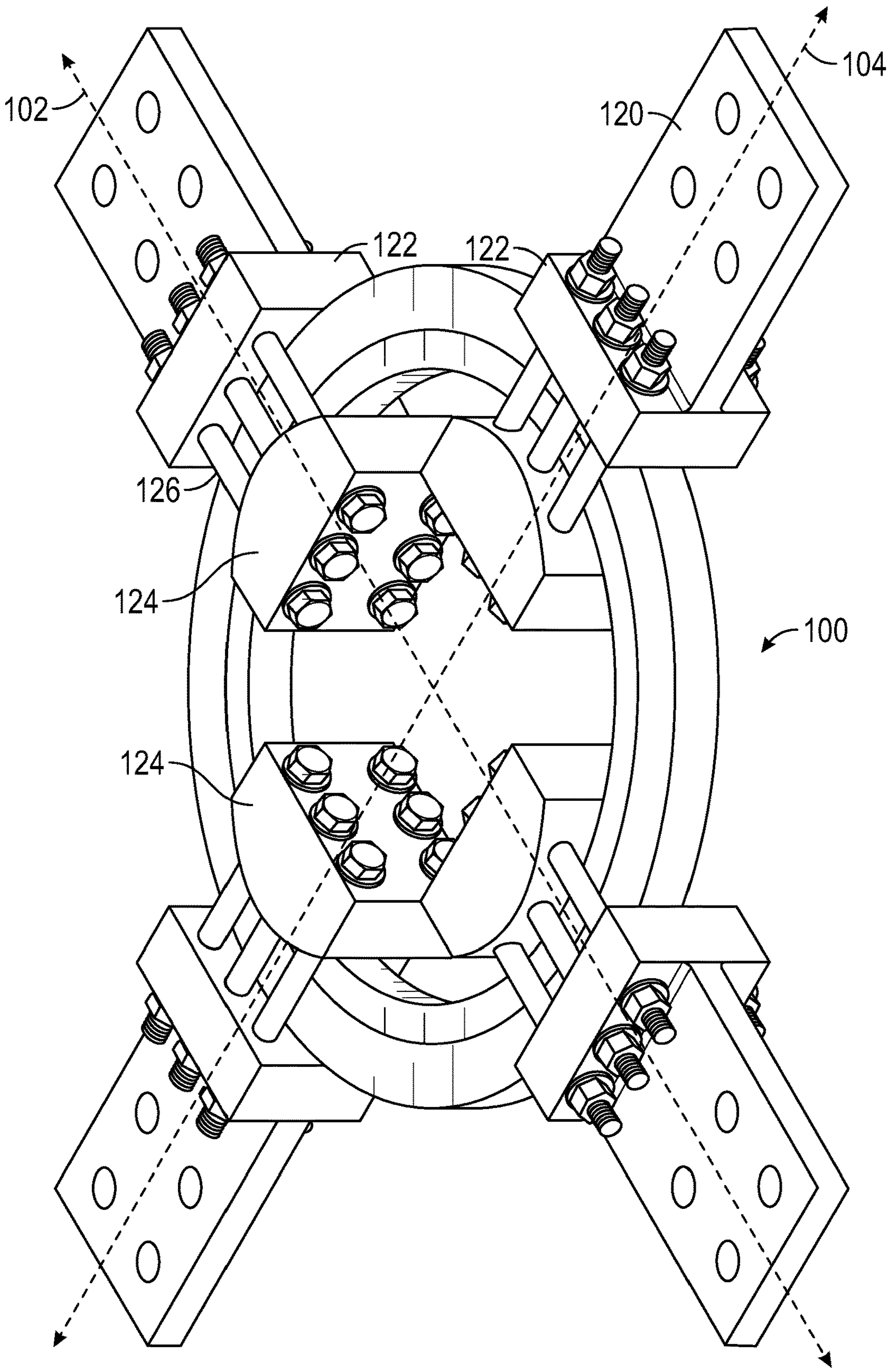

For example, FIGS. 7A and 7B show examples of different configurations where a device 100 according to embodiments of the present disclosure may be secured to a building 110 or other structure via one or more connecting bodies 120. As can be seen in FIG. 7A, there are many possible arrangements for connecting a device 100 according to embodiments of the present disclosure to a structure using one or more connecting bodies 120. However, many other arrangements of connecting a device 100 according to embodiments of the present disclosure to a structure using connecting bodies 120 may be envisioned. Additionally, other connection mechanisms (e.g., different types of clamps) may be used to connect, either directly or indirectly, a device 100 according to embodiments of the present disclosure to a structure.

For example, FIG. 7B shows an example of a device 100 according to the embodiments of the present disclosure connected to connecting bodies 120 extending in multiple directions. The device 100 may include an assembly of elements with a concentric ring configuration where multiple connecting bodies 120 (e.g., two or more connecting bodies 120) may extend in multiple directions away from the device 100 and connect at an opposite end to a structure (e.g., structure 110 in FIG. 7A). Advantageously, when using a concentrically assembled ring configuration to form a device according to the embodiments of the present disclosure, connecting bodies may extend from more directions than a single axial dimension, where the ring configuration may allow damping in the multiple directions from which the connecting bodies extend. For example, in the embodiment shown, connecting bodies 120 may be connected along two perpendicular axes 102, 104. In other embodiments, connecting bodies 120 may be connected along more or less than two axes and/or in different non-perpendicular directions.

In some embodiments, the connecting bodies 120 may be connected to the device 100 using multiple connection pieces 122, 124 attached around the device 100 using a number of fasteners 126 (e.g., bolts or screws). Other embodiments may have connecting bodies 120 attached to a device according to the embodiments of the present disclosure in other configurations (e.g., using hooks or clamps). Those having ordinary skill in the art may also appreciate that different types of connection mechanisms may be used to connect devices according to the embodiments of the present disclosure to a structure, such that the device may provide damping to the structure in multiple different directions (e.g., along different axes).

Advantages

Devices disclosed herein using at least two elements working in conjunction to absorb shocks and other movements may provide an improvement over devices using a single superelastic element to absorb shock. For example, by using an energy-absorbing element in assemblies according to embodiments of the present disclosure, such as a malleable ring, the energy-absorbing material (e.g., malleable metals) may absorb energy when deformed by very small amounts. As described above, ASMAs may be deformed to about 1% strain before its stress-induced transformation begins to occur, so the ASMA element may have no energy absorption effect until that strain is reached. By using a double or triple or more ring device, as described above, the energy-absorbing material (e.g., malleable metal) may damp very small deflections, such as wind buffeting in a skyscraper, while the ASMA component may provide damping for larger shocks, such as earthquakes.

Further, devices according to embodiments of the present disclosure may have an outer element made of an ASMA that at least partially surrounds an inner element made of an energy-absorbing material. In some embodiments, an energy-absorbing element (e.g., an inner ring) may be composed of an MSMA. The MSMA element, which is already in its martensitic state at the service temperature, may be deformed by merely realigning the martensite, which may absorb energy and happen at a much lower stress or deformation than that needed to cause martensitic transformation in an ASMA. An additional possible advantage of using an energy-absorbing element composed of an MSMA is that, if it is desired, the structure may be brought back closer to its original shape by heating the structure (e.g., to help restore the device to or towards its original shape after a large shock event), while other malleable metals may not.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. A damping device, comprising:

a superelastic element made of an austenitic shape memory alloy; and an energy-absorbing element adjacent to the superelastic element, wherein the energy-absorbing element is made of a material selected from the group consisting of a shape memory alloy, a malleable metal or alloy, and a viscoelastic polymer, wherein the superelastic element is a first ring, and the energy-absorbing element is a second ring, wherein second ring is fitted inside the first ring, such that the first ring surrounds and encloses the second ring, wherein the device is connected to a structure via two or more connecting bodies extending outwardly from the device in multiple different directions, and wherein deformation of the energy-absorbing element is restrained by the superelastic element.

2. The damping device of claim 1, wherein the austenitic shape memory alloy is a nickel titanium alloy.

3. The damping device of claim 1, further comprising a third ring fitted inside the second ring, wherein the third ring is a second superelastic element made of the austenitic shape memory alloy.

4. The damping device of claim 1, wherein the first ring and the second ring each have a thickness ranging from 5 to 15 percent of an outer diameter of the first and second rings, where the thickness is measured between an inner diameter and the outer diameter of each of the first and second rings.

5. The damping device of claim 1, wherein the first ring and the second ring have non-circular shapes.

6. The damping device of claim 1, wherein one of the superelastic element and the energy-absorbing element is under an initial strain of at least 1 percent, and the other of the superelastic element and the energy-absorbing element is under an initial oppositely-signed strain.

7. A damping device, comprising:

a superelastic element made of an austenitic shape memory alloy; and an energy-absorbing element adjacent to the superelastic element, wherein the energy-absorbing element is made of a material selected from the group consisting of a shape memory alloy, a malleable metal or alloy, and a viscoelastic polymer, wherein the superelastic element and the energy-absorbing element have elongate bodies, and wherein the superelastic element and the energy-absorbing element are attached at two spaced apart locations, wherein the elongate bodies are tubes, and wherein deformation of the energy-absorbing element is restrained by the superelastic element.

8. A damping device, comprising:

a first superelastic element; and a second superelastic element restrained by the first superelastic element;

wherein the first and second superelastic elements are made of austenitic shape memory alloys, wherein one of the first superelastic element and second superelastic element is under an initial strain of at least 1 percent and the other of the first superelastic element and the second superelastic element is under an initial oppositely-signed strain of at least 1 percent, and wherein the first superelastic element and the second superelastic element have elongate bodies that are attached together in at least two spaced apart locations, wherein the initial strain and the initial oppositely-signed strain are in one of a tension regime or a bending regime.

9. The damping device of claim 8, wherein the first superelastic element and the second superelastic element are concentrically positioned tubes attached at opposite axial ends.

10. The damping device of claim 9, wherein the concentrically positioned tubes are attached together with the initial strain and the initial oppositely-signed strain in a torsional regime.

11. A method of making a damping device, comprising:

fabricating a first element from a first austenitic shape memory alloy;

fabricating a second element from a material selected from the group consisting of a martensitic shape memory alloy, a second austenitic shape memory alloy, a malleable metal or alloy, and a viscoelastic polymer;

assembling the first and second elements together, such that deformation of the second element is restrained by the first element; and assembling a third element to the second element, wherein the third element is made of a superelastic shape memory alloy.

12. The method of claim 11, further comprising introducing initial strains in the first element or the second element to create stress induced martensite and assembling the first and second elements together with the introduced initial strains.

13. The method of claim 11, wherein the first element and the second element are rings, and wherein the assembling comprises fitting the second element inside the first element.

14. The method of claim 13, further comprising introducing initial strains in the first element or the second element prior to fitting the second element inside the first element, wherein when the first and second elements are in an unstrained configuration, an outer diameter of the second element is greater than an inner diameter of the first element, wherein the initial strains are introduced in the first element or the second element to fit the second element inside the first element, and wherein when the second element is fitted inside the first element, the outer diameter of the second element is equal to the inner diameter of the first element and at least one of the first element and the second element comprise a microstructure having stress induced martensite.

* * * * *